(12) United States Patent
Tang

(10) Patent No.: US 11,252,735 B2
(45) Date of Patent: *Feb. 15, 2022

(54) COMMON RESOURCE-BASED DATA TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 19 days.

This patent is subject to a terminal disclaimer.

(21) Appl. No.: 16/866,330

(22) Filed: May 4, 2020

(65) Prior Publication Data

US 2020/0267735 A1  Aug. 20, 2020

Related U.S. Application Data

(63) Continuation of application No. 15/999,278, filed as application No. PCT/CN2016/080805 on Apr. 29, 2016, now Pat. No. 10,681,705.

(51) Int. Cl.
*H04W 72/04* (2009.01)
*H04W 74/00* (2009.01)
(Continued)

(52) U.S. Cl.
CPC ....... *H04W 72/0493* (2013.01); *H04L 1/0003* (2013.01); *H04W 56/0005* (2013.01);
(Continued)

(58) Field of Classification Search
CPC . H04W 72/0493; H04W 76/12; H04W 92/10; H04W 56/0005; H04W 72/044;
(Continued)

(56) References Cited

U.S. PATENT DOCUMENTS 8,804,508 B1   8/2014 Hobbs
8,862,141 B2  10/2014 Barreto
(Continued)

FOREIGN PATENT DOCUMENTS

CN   101998523 A   3/2011
CN   102461299 A   5/2012
(Continued)

OTHER PUBLICATIONS

First Office Action of the European application No. 16899882.1, dated May 20, 2020.
(Continued)

*Primary Examiner* — Pao Sinkantarakorn
*Assistant Examiner* — Kabir U Jahangir
(74) *Attorney, Agent, or Firm* — Ladas & Parry LLP

(57) ABSTRACT

Provided in the present invention are common resource-based data transmission method and device. A communication method according to the present invention comprises: acquiring common resource configuration information; determining, based on the common resource configuration information, an available resource for data transmission; and transmitting data based on the available resource. Another communication method according to the present invention comprises: determining common resource configuration information; sending to one or more terminals the common resource configuration information; and performing, based on the common resource configuration information, data transmission with a first terminal of the one or more terminals. The solutions provided in the present invention enable a terminal to transmit data with no signaling cost or a reduced required signaling cost.

15 Claims, 5 Drawing Sheets

(51) Int. Cl.
  *H04W 76/12* (2018.01)
  *H04W 76/11* (2018.01)
  *H04L 1/00* (2006.01)
  *H04W 56/00* (2009.01)
  *H04W 92/10* (2009.01)

(52) U.S. Cl.
  CPC ....... *H04W 72/042* (2013.01); *H04W 72/044* (2013.01); *H04W 74/006* (2013.01); *H04W 76/11* (2018.02); *H04W 76/12* (2018.02); *H04W 92/10* (2013.01)

(58) Field of Classification Search
  CPC . H04W 76/11; H04W 74/006; H04W 72/042; H04L 1/0003
  See application file for complete search history.

(56) References Cited

U.S. PATENT DOCUMENTS

| | | |
|---|---|---|
| 2010/0206660 A1 | 8/2010 | Baowei |
| 2011/0170515 A1 | 7/2011 | Kim |
| 2012/0044878 A1 | 2/2012 | Ratasuk |
| 2012/0158966 A1* | 6/2012 | Eberlein ............. H04L 41/5058 709/226 |
| 2012/0176951 A1 | 7/2012 | Pradas |
| 2012/0196609 A1 | 8/2012 | Barreto |
| 2014/0036670 A1 | 2/2014 | Li et al. |
| 2014/0078908 A1 | 3/2014 | Kim |
| 2016/0095017 A1* | 3/2016 | Ely ....................... H04W 28/20 455/454 |
| 2016/0157255 A1 | 6/2016 | Li et al. |
| 2017/0041981 A1 | 2/2017 | Kela et al. |

FOREIGN PATENT DOCUMENTS

| | | |
|---|---|---|
| CN | 103702422 A | 4/2014 |
| EP | 2685764 A1 | 1/2014 |
| JP | 2011520376 A | 7/2011 |
| JP | 2011155336 A | 8/2011 |
| JP | 2016052127 A | 4/2016 |
| JP | 2017535156 A | 11/2017 |
| WO | 2010057540 A1 | 5/2010 |
| WO | 2015085273 A1 | 6/2015 |
| WO | 2016008537 A1 | 1/2016 |
| WO | 2016053639 A1 | 4/2016 |

OTHER PUBLICATIONS

3GPP TS 36.321 V13.0 0 (Dec. 2015), 3rd Generation Partnership Project; Technical Specification Group Radio Access Network; Evolved Universal Terrestrial Radio Access (E-UTRA); Medium Access Control (MAC) protocol specification (Release 13), pp. 1-82.

3GPP TS 36.304 V13.0.0 (Dec. 2015), 3rd Generation Partnership Project; Technical Specification Group Radio Access Network; Evolved Universal Terrestrial Radio Access (E-UTRA); User Equipment (UE) procedures in idle mode (Release 13), pp. 1-42.

International Search Report in the international application No. PCT/CN2016/080805, dated Dec. 30, 2016.

English translation of the Written Opinion of the International Search Authority in the international application No. PCT/CN2016/080805, dated Dec. 30, 2016.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)" 3GPP Standard; 3GPP TS 36.300, 3rd Generation Partnership Project (3GPP), Mobile Competence Centre ; 650, Route des Lucioles ; F-06921 Sophia-Antipolis Cedex ; France, vol. RAN WG2, No. V13.3.0, Apr. 1, 2016 (Apr. 1, 2016), pp. 1-295, XP051088532.

"3rd Generation Partnership Project; Technical Specification Group Core Network and Terminals; General Packet Radio System (GPRS) Tunnelling Protocol User Plane (GTPv1-U) (Release 13)" 3GPP Standard; 3GPP TS 29.281, 3rd Generation Partnership Project (3GPP), Mobile Competence Centre ; 650, Route des Lucioles ; F-06921 Sophia-Antipolis Cedex; France, vol. CT WG4, No. V13.1.0, Mar. 17, 2016 (Mar. 17, 2018), pp. 1-29, XP051088078, {retrieved on Mar. 17, 2016}.

Supplementary European Search Report in the European application No. 16899882.1, dated Dec. 19, 2018.

First Office Action of the Japanese application No. 2018-548357, dated Jan. 10, 2020.

First Office Action of the Indian application No. 201817043056, dated Sep. 30, 2020.

Second Office Action of the Japanese application No. 2018-548357, dated Sep. 15, 2020.

First Office Action of the Taiwanese application No. 106111279, dated Oct. 12, 2020.

* cited by examiner

COMMON RESOURCE-BASED DATA TRANSMISSION METHOD AND DEVICE

CROSS REFERENCE TO RELATED APPLICATIONS

This application is a continuation of U.S. application Ser. No. 15/999,278 filed on Aug. 17, 2018, which is a national phase under 35 U.S.C. § 371 of PCT International Application No. PCT/CN2016/080805, filed on Apr. 29, 2016. The contents of these applications are hereby incorporated by reference in their entirety.

BACKGROUND

In an existing Universal Mobile Telecommunication System (LUMTS) or Long Term Evolution (LTE) system, if a terminal is required to perform data transmission (for example, receiving or sending specific data of the terminal), it is necessary at first to establish a Radio Resource Control (RRC) signaling connection with a network to enter an RRC connected state and establish a dedicated data bearer. After the data is received or sent, the terminal is also required to coordinate with the network to execute an RRC connection release process.

It can be seen that, when a terminal is required to receive or send data, particularly when there is only a small amount of data required to be received or sent, a signaling overhead is relatively high, while if a large number of terminals are required to receive or send data, massive RRC signaling interactions may be generated in a network. All of these conditions may bring a heavy signaling burden to the network.

Therefore, there is a need for a solution capable of implementing data transmission of a terminal in a manner of avoiding or reducing a required signaling overhead.

SUMMARY

The disclosure relates to a wireless communication technology, and particularly to a method and device for data transmission with common resources.

The disclosure provides a method and device for data transmission with common resources.

A communication method according to the disclosure may include that: configuration information for common resources is obtained; available resources for data transmission is determined based on the configuration information for common resources; and data transmission is performed based on the available resources.

Another communication method according to the disclosure may include that: configuration information for common resources is determined; the configuration information for common resources is sent to one or more terminals; and data transmission with a first terminal in the one or more terminals is performed based on the configuration information for common resources.

A communication device according to the disclosure may include: a unit configured to obtain configuration information for common resources; a unit configured to determine available resources for data transmission based on the configuration information for common resources; and a unit configured to perform data transmission based on the available resource.

Another communication device according to the disclosure may include: a unit configured to determine configuration information for common resources; a unit configured to send the configuration information for common resources to one or more terminals; and a unit configured to perform data transmission with a first terminal in the one or more terminals based on the configuration information for common resources.

Another communication device according to the disclosure may include: a memory; and a processor, configured to execute an instruction stored in the memory to enable the communication device to execute the method according to the disclosure.

A computer program product according to the disclosure may include a computer-readable medium with an instruction stored thereon, wherein the instruction may be executed by one or more processors to implement the method according to the disclosure.

BRIEF DESCRIPTION OF DRAWINGS

The abovementioned and other features, characteristics, advantages and benefits of the disclosure will become more obvious through the following detailed descriptions made in combination with the drawings, wherein.

DETAILED DESCRIPTION

The disclosure discloses implementation of data transmission of a terminal with common resources so as to avoid or reduce a required signaling overhead. For example, the terminal may perform data transmission through the solution disclosed in the disclosure in an idle mode or an RRC connected state.

Figure 1:
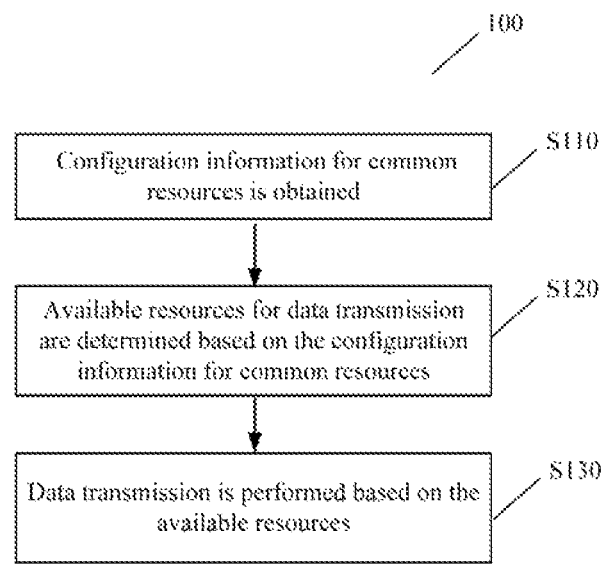
FIG. 1 is a flowchart of a method for data transmission with common resources according to an embodiment of the disclosure.

FIG. 1 is a flowchart of a method 100 for data transmission with common resources according to an embodiment of the disclosure. The method 100 may be executed at, for example, a terminal.

In S110, configuration information for common resources may be obtained. The configuration information for common resources may be predefined by a network protocol, so that the terminal may determine the configuration information for common resources based on a predefinition of the network protocol. In addition, the configuration information for common resources may also be preconfigured by a network. For example, the terminal may receive the configuration information for common resources from an access network entity.

The configuration information for common resources may be configured to specify a combination of resources shared among different terminals in a time period. The time period mentioned herein may refer to a frame or any other similar periodic time period. The configuration information for common resources may include one or more of a time-domain resource, a frequency-domain resource, a modulation and coding scheme, a transmission block size and the like, and may also include any other resource for data transmission. The configuration information for common resources may include one or more items of configuration information divided within a time period. Each item of configuration information may include a corresponding configuration, for example, at least one of a resource identifier, a time-domain resource, a frequency-domain resource, a modulation and coding scheme or the transmission block size. Table 1 illustrates an exemplary structure of the configuration information for common resources.

TABLE 1

| Resource identifier | Time-domain resource | Frequency-domain resource | Modulation and coding scheme | Transmission block size |
|---|---|---|---|---|
| 1 | T1~T2 | F1~F2 | M1 | S1 |
| 2 | T1~T2 | F3~F4 | M2 | S2 |
| 3 | T3~T4 | F1~F2 | M3 | S1 |
| 4 | T3~T4 | F3~F4 | M4 | S2 |

The configuration information for common resources illustrated in Table 1 may include N items of configuration information, wherein N=4 and the items of configuration information may be identified with resource identifiers 1, 2, 3 and 4 respectively. Each item of configuration information includes the resource identifier, the time-domain resource, the frequency-domain resource, the modulation and coding scheme and the transmission block size. For example, for the first item of configuration information, the resource identifier is 1, the time-domain resource is T1~T2, the frequency-domain resource is F1~F2, the modulation and coding scheme is M1 and the transmission block size is S1. In Table 1, time-domain resources are divided into two time periods, i.e., T1~T2 and T3~T4, and the two time periods may be continuous and may also be discontinuous in time. Further, the time-domain resources may also be divided into any multiple time periods according to a practical application in the disclosure. In Table 1, frequency-domain resources are divided into two frequency bands, i.e., F1~F2 and F3~F4, and the two frequency bands may be continuous and may also be discontinuous in frequency. In addition, the frequency-domain resources may also be divided into any multiple frequency bands according to the practical application in the disclosure. As illustrated in Table 1, the modulation and coding scheme includes M1, M2 and M3, and the transmission block size includes S1 and S2. However, according to the practical application, the configuration information for common resources may also include a modulation and coding scheme of any other type and any other transmission block size.

Table 1 only illustrates an example structure of the configuration information for common resources. In practice, according to the disclosure, the configuration information for common resources may adopt any other structure and may selectively include one or more of the resources illustrated above or include any other resource which is not illustrated, and any other division manner or numerical value may be defined for each type of resources.

In S120, available resources for data transmission may be determined based on the configuration information for common resources. Data transmission may be downlink data transmission from the access network entity to the terminal or uplink data transmission from the terminal to the access network entity. The terminal may determine resources available for downlink data transmission or uplink data transmission based on the configuration information for common resources according to a predetermined rule.

In S130, the terminal may perform data transmission based on the determined available resources.

Figure 2:
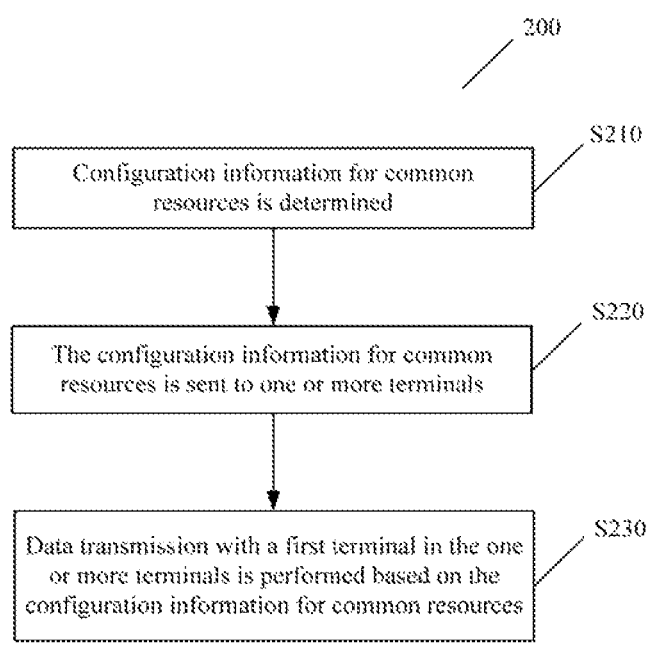
FIG. 2 is a flowchart of a method for data transmission with common resources according to an embodiment of the disclosure.

FIG. 2 is a flowchart of a method 200 for data transmission with common resources according to an embodiment of the disclosure. The method 200 may be executed at a network entity with an access function (for example, an access network entity).

In S210, configuration information for common resources may be determined. For example, the access network entity may specify data transmission resources shared among different terminals and indicate these common resources in the configuration information for common resources.

In S220, the configuration information for common resources may be sent to one or more terminals. For example, the access network entity may send the configuration information for common resources to the terminals in a broadcast channel manner or in a dedicated signaling manner.

In S230, data transmission with a first terminal in the one or more terminals may be performed based on the configuration information for common resources. For example, the access network entity may send downlink data to the first terminal based on the configuration information for common resources, or the access network entity may receive uplink data sent based on the configuration information for common resources from the first terminal.

Example solutions for data transmission with common resources according to the disclosure may further be specifically described below in combination with schematic interaction diagrams illustrated in FIG. 3-FIG. 6.

Figure 3:
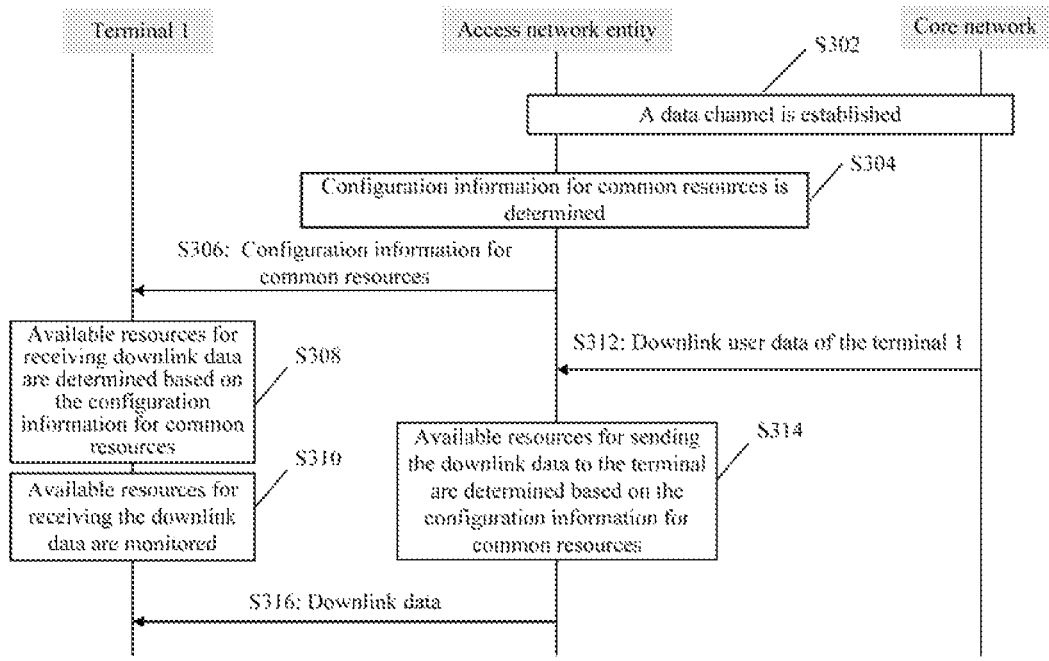
FIG. 3 is a schematic interaction diagram of data transmission with common resources according to an embodiment of the disclosure.

FIG. 3 is a schematic interaction diagram of data transmission with common resources according to an embodiment of the disclosure. An interaction process illustrated in FIG. 3 is for a scenario where configuration information for common resources is transmitted by an access network entity and the access network entity sends downlink data to a terminal 1.

In S302, a data channel may be established between the access network entity and a core network.

In one example, the access network entity may establish a common channel, for example, a common General Packet Radio Service (GPRS) Tunneling Protocol-User plane (GTP-U) channel, with the core network. The common channel may be configured to transmit user data and the like of one or more terminals between the access network entity and the core network.

In the other example, a terminal dedicated channel, for example, a GTP-U channel dedicated to the terminal 1, may be established between the access network entity and the core network. When the terminal 1 is attached to the network, the GTP-U channel dedicated to the terminal 1 may be established through communication among the terminal 1, the access network entity and the core network. The terminal dedicated channel may be configured to transmit user data and the like of the terminal 1.

In S304, the access network entity may determine the configuration information for common resources. As described above, the configuration information for common resources may include one or more items of configuration information divided within a time period. Each item of configuration information may include one or more of a resource identifier, a time-domain resource, a frequency-domain resource, a modulation and coding scheme and a transmission block size.

In S306, the access network entity may send the configuration information for common resources to the terminals. In at least one embodiment, the access network entity may send the configuration information for common resources to one or more terminals within its coverage by using system information in a broadcast manner. In at least one embodiment, the access network entity may also send the configuration information for common resources to the one or more terminals through dedicated signaling.

In S308, the terminal 1 may determine available resources for receiving the downlink data based on the configuration information for common resources after receiving the configuration information for common resources.

For example, the terminal 1 may determine the available resources for receiving the downlink data according to a predetermined rule.

At first, the terminal 1 may determine a transmission time period when downlink data transmission is performed based on its terminal identifier. For example, the transmission time period when downlink data transmission is performed may be determined according to the following formula 1: $T\_D \bmod T = UE\_ID \bmod T$ (formula 1).

In the above formula 1, $T\_D$ represents the transmission time period, T represents a discontinuous receiving period (for example, DRX) of the terminal 1 and $UE\_ID$ represents the terminal identifier. The terminal identifier may be an International Mobile Subscriber Identity (IMSI), a Tunnel Endpoint Identifier (TEID) or any other information available for identifying the terminal. When the discontinuous receiving period of the terminal 1 includes multiple transmission time periods, the terminal 1 may learn about the specific transmission time period when downlink data transmission may be performed in the discontinuous receiving period based on the abovementioned manner.

Then, the terminal 1 may determine the corresponding item of configuration information in the configuration information for common resources based on the terminal identifier. For example, the corresponding item of configuration information may be determined according to the following formula 2: $I = UE\_ID) \bmod N$ (formula 2).

In the above formula 2, I represents the resource identifier, $UE\_ID$ represents the terminal identifier and N represents a total number of the items of configuration information in the configuration information for common resources. According to the abovementioned manner, the terminal 1 may determine the corresponding item of configuration information in the configuration information for common resources and further determine that the transmitted downlink data may be received by using the configuration in the corresponding item of configuration information. For example, the terminal 1 may learn about the specific resources for downlink data transmission in the determined transmission time period, and the specific resources may include, for example, the time-domain resource, the frequency-domain resource, the modulation and coding scheme and the transmission block size.

In S310, the terminal 1 may monitor the determined available resources for receiving the downlink data.

In S312, the core network may send the downlink user data of the terminal 1 to the access network entity through the data channel established between the access network entity and the core network. When the data channel is a common channel, the downlink user data may further include the terminal identifier of the terminal 1, so that the access network entity may determine that the downlink user data is for the terminal 1 based on the terminal identifier. When the terminal dedicated channel for the terminal 1 is established between the access network entity and the core network, it is unnecessary to provide the terminal identifier together with the downlink user data by the core network. This is due to the case that the access network entity may determine that the downlink user data is for the terminal 1 based on reception of the downlink user data through the terminal dedicated channel.

In S314, the access network entity may determine the available resources for sending the downlink data to the terminal 1 based on the configuration information for common resources after receiving the downlink user data of the terminal 1 from the core network. The access network entity may determine the available resources for sending the downlink data according to the predetermined rule. For example, the access network entity may determine, based on the terminal identifier corresponding to the downlink user data received from the core network, the transmission time period when downlink data transmission of the terminal 1 is performed and then may determine the corresponding item of configuration information in the configuration information for common resources based on the terminal identifier. A specific manner in which the access network entity determines the available resources for sending the downlink data to the terminal 1 is the same as a manner in which the terminal 1 determines the available resources for receiving the downlink data in S308. Therefore, the access network entity may also determine the available resources for sending the downlink data to the terminal 1 by adopting the formula 1 and the formula 2.

In S316, the access network entity may send the downlink data to the terminal 1 on the determined available resources for sending the downlink data to the terminal 1. The downlink data may include the terminal identifier of the terminal 1. For example, the terminal identifier may be included in a layer-2 data unit of an air interface.

In one example, the downlink data sent by the access network entity to the terminal 1 may be air interface user data. In this example, a data channel may be carried on the available resources. The air interface user data may be generated by the access network entity based on the downlink user data, received from the core network, of the terminal 1. Furthermore, after the air interface user data is received from the access network entity, the terminal 1 may process the air interface user data responsive to determining that the air interface user data is sent to the terminal 1 itself based on the terminal identifier received together with the air interface user data.

In another example, the downlink data sent by the access network entity to the terminal 1 may be control information. In this example, a control channel may be carried on the available resources. The control information may be configured to indicate a resource configuration for transmitting the air interface user data to the terminal 1, and the resource configuration may include for example, the time-domain resource, the frequency-domain resource, the modulation and coding scheme and the transmission block size. Therefore, the access network entity may subsequently send the air interface user data to the terminal 1 based on the resource configuration indicated by the control information. Correspondingly, the terminal 1 may receive the air interface user data from the access network entity based on the resource configuration indicated by the control information. The air interface user data may be generated by the access network entity based on the downlink user data, received from the core network, of the terminal 1.

Figure 4:
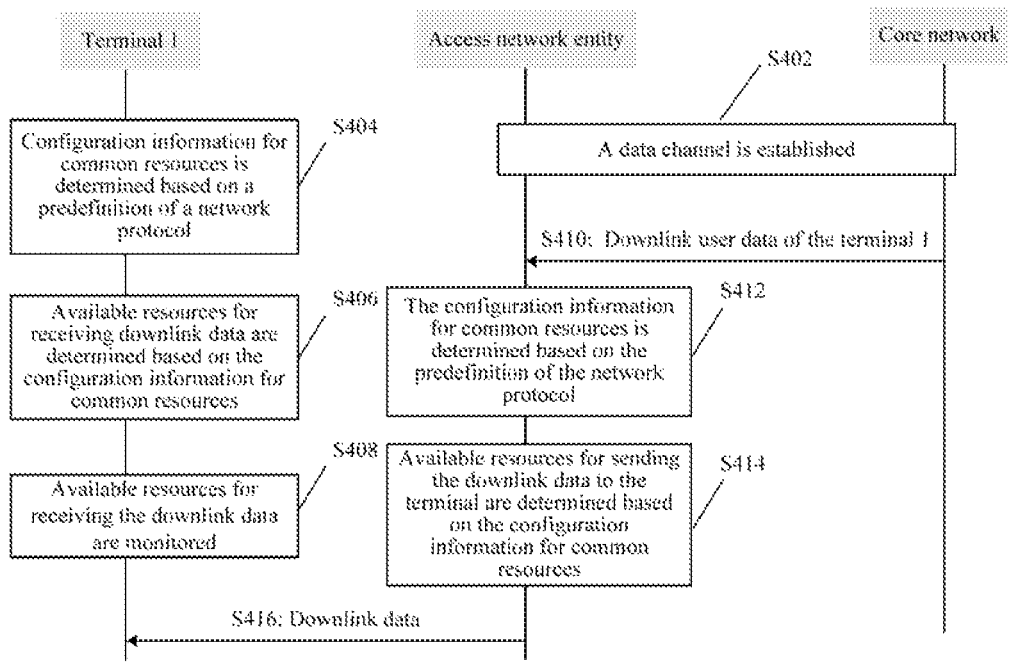
FIG. 4 is a schematic diagram of data transmission with common resources according to an embodiment of the disclosure.

FIG. 4 is a schematic interaction diagram of data transmission with common resources according to an embodiment of the disclosure. An interaction process illustrated in FIG. 4 is for a scenario where configuration information for common resources is predefined by a network protocol and an access network entity sends downlink data to a terminal 1.

In S402, a data channel may be established between the access network entity and a core network. The operation is similar to the processing in S302 in FIG. 3.

In S404, the terminal 1 may determine the configuration information for common resources based on a predefinition of the network protocol. As described above, the configuration information for common resources may be predefined by the network protocol. Therefore, the terminal 1 may obtain the configuration information for common resources from the predefinition of the network protocol.

In S406, the terminal 1 may determine available resources for receiving the downlink data based on the configuration information for common resources. The operation is similar to the processing in S308 in FIG. 3.

In S408, the terminal 1 may monitor the determined available resources for receiving the downlink data. The operation is similar to the processing in S310 in FIG. 3.

In S410, the core network may send the downlink user data of the terminal 1 to the access network entity through the data channel between the access network entity and the core network. The operation is similar to the processing in S312 in FIG. 3.

In S412, the access network entity may determine the configuration information for common resources based on the predefinition of the network protocol.

In S414, the access network entity may determine the available resources for sending the downlink data to the terminal 1 based on the configuration information for common resources. The operation is similar to the processing in S314 in FIG. 3.

In S416, the access network entity may send the downlink data to the terminal 1 on the determined available resources for sending the downlink data to the terminal 1. The operation is similar to the processing in S316 in FIG. 3.

Figure 5:
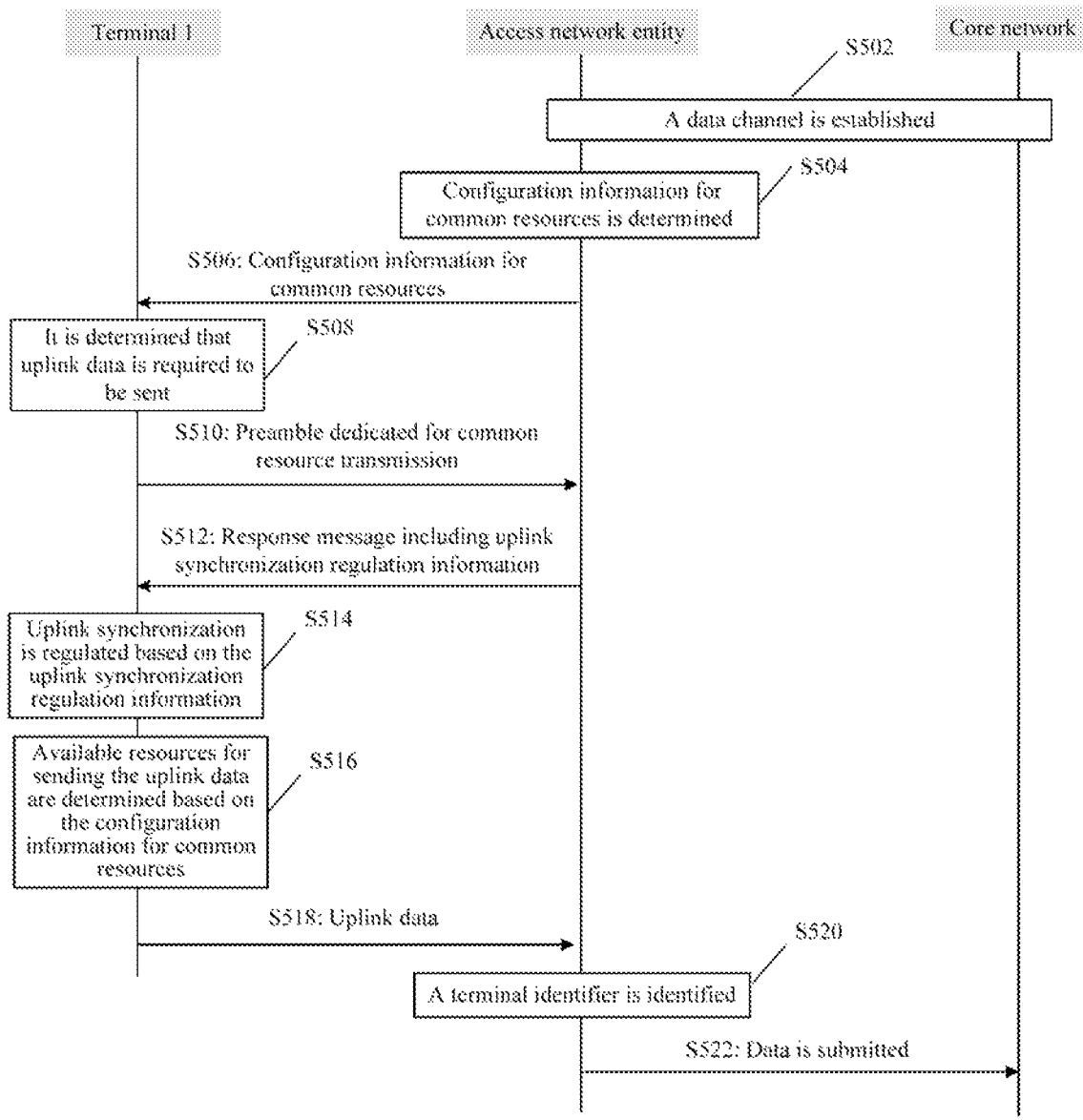
FIG. 5 is a schematic interaction diagram of data transmission with common resources according to an embodiment of the disclosure.

FIG. 5 is a schematic interaction diagram of data transmission with common resources according to an embodiment of the disclosure. An interaction process illustrated in FIG. 5 is for a scenario where configuration information for common resources is transmitted by an access network entity and a terminal 1 sends uplink data to the access network entity.

In S502, a data channel may be established between the access network entity and a core network. In S504, the access network entity may determine the configuration information for common resources. In S506, the access network entity may send the configuration information for common resources to the terminal 1. The processing in S502, S504 and S506 is similar to the processing in S302, S304 and S306 in FIG. 3, respectively.

In S508, the terminal 1 determines that the uplink data is required to be sent.

In S510, the terminal 1 may send a preamble dedicated for common resource transmission to the access network entity.

In S512, responsive to reception of the preamble dedicated for common resource transmission from the terminal 1, the access network entity may return a response message to the terminal 1, wherein the response message may include uplink synchronization regulation information.

In S514, the terminal 1 may regulate uplink synchronization based on the uplink synchronization regulation information in the response message returned by the access network entity.

In S516, the terminal 1 may determine available resources for sending the uplink data based on the configuration information for common resources.

At first, the terminal 1 may determine a transmission time period for sending the uplink data. For example, the terminal 1 may select a transmission time period after the response message received in S512, or may also select in any other manner.

Then, the terminal 1 may determine the specific resource configuration required for sending the uplink data within the transmission time period, namely determining a configuration of the specific item of configuration information to be used within the transmission time period in the configuration information for common resources. In at least one embodiment, the terminal 1 may randomly select an item of configuration information from the configuration information for common resources and determine that the configuration in the item of configuration information is configured to send the uplink data within the determined transmission time period. In at least one embodiment, the terminal 1 may also determine the item of configuration information by using the formula 2 and further determine the configuration for sending the uplink data within the determined transmission time period.

In S518, the terminal 1 may send the uplink data to the access network entity. The uplink data may include a terminal identifier of the terminal 1. For example, the terminal identifier may be included in a layer-2 data unit of an air interface.

In S520, the access network entity may identify the terminal identifier from the uplink data after receiving the uplink data from the terminal 1.

In S522, the access network entity may submit data to the core network, wherein the submitted data may be generated by the access network entity based on the uplink data received from the terminal 1. When a terminal dedicated channel for the terminal 1 is established between the access network entity and the core network, the access network entity may directly submit the data in the terminal dedicated channel. When the data channel established between the access network entity and the core network is a common channel, the access network entity may include the terminal identifier in the submitted data.

Figure 6:
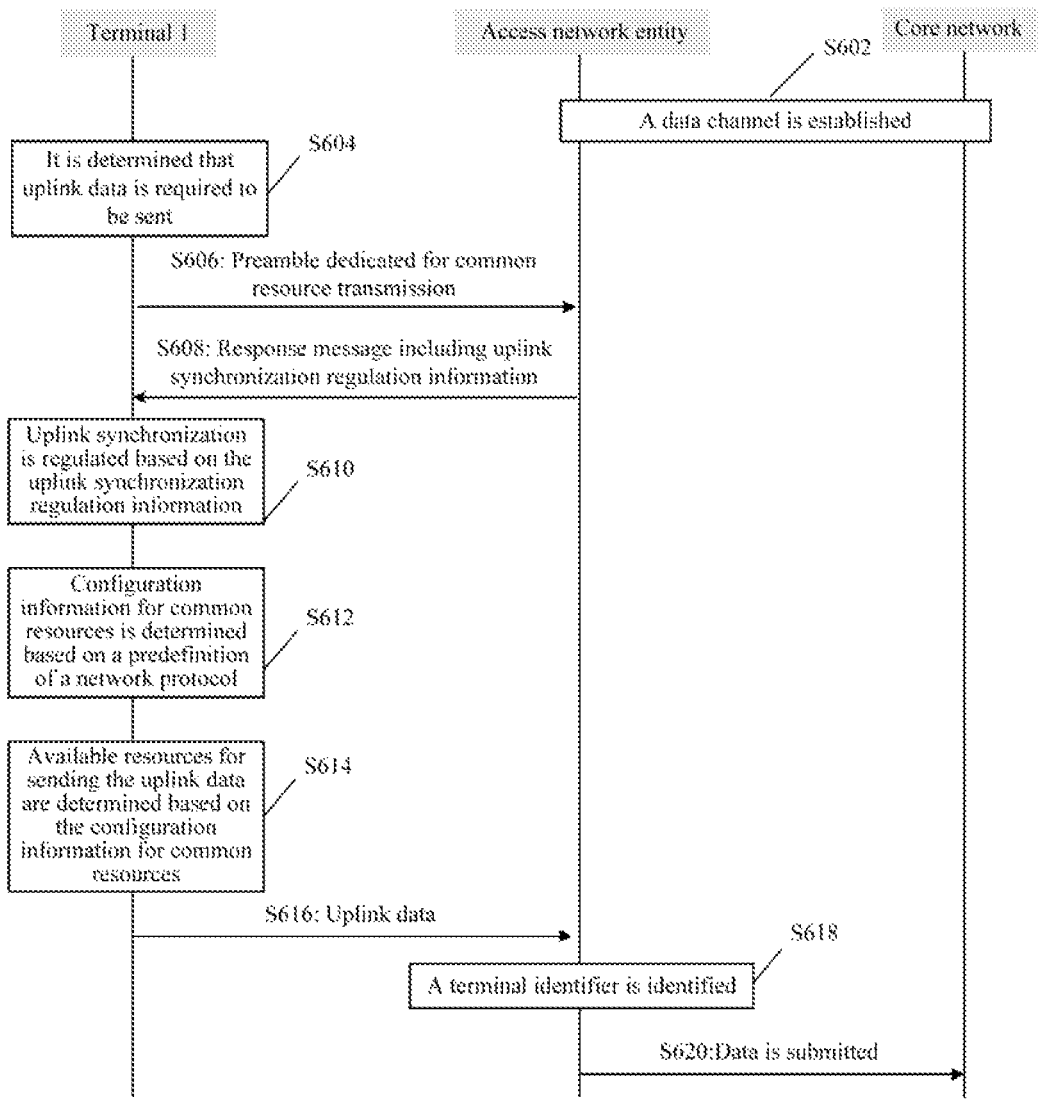
FIG. 6 is a schematic interaction diagram of data transmission with common resources according to an embodiment of the disclosure.

FIG. 6 is a schematic interaction diagram of data transmission with common resources according to an embodiment of the disclosure. An interaction process illustrated in FIG. 6 is for a scenario where configuration information for common resources is predefined by a network protocol and a terminal 1 sends uplink data to an access network entity.

In S602, a data channel may be established between the access network entity and a core network. In S604, the terminal 1 determines that the uplink data is required to be sent. In S606, the terminal 1 sends a preamble dedicated to common resource transmission to the access network entity. In S608, responsive to reception of the preamble dedicated for common resource transmission from the terminal 1, the access network entity returns a response message to the terminal 1, wherein the response message may include uplink synchronization regulation information. In S610, the terminal 1 may regulate uplink synchronization based on the uplink synchronization regulation information in the response message returned by the access network entity. The processing in S602, S604, S606, S608 and S610 is similar to the processing in S502, S508, S510, S512 and S514 in FIG. 5, respectively.

In S612, the terminal 1 may determine the configuration information for common resources based on a predefinition of the network protocol.

In S614, the terminal 1 may determine available resources for sending the uplink data based on the configuration information for common resources. In S616, the terminal 1 may send the uplink data to the access network entity. In S618, the access network entity may identify a terminal identifier from the uplink data. In S620, the access network entity may submit data to the core network. The processing in S614, S616, S618 and S620 is similar to the processing in S516, S518, S520 and S522 in FIG. 5, respectively.

The execution sequence of operations in the interaction processes described above in combination with FIG. 3-FIG. 6 is only schematic and the sequence of any two operations may be adjusted according to a specific application and a practical requirement.

Figure 7:
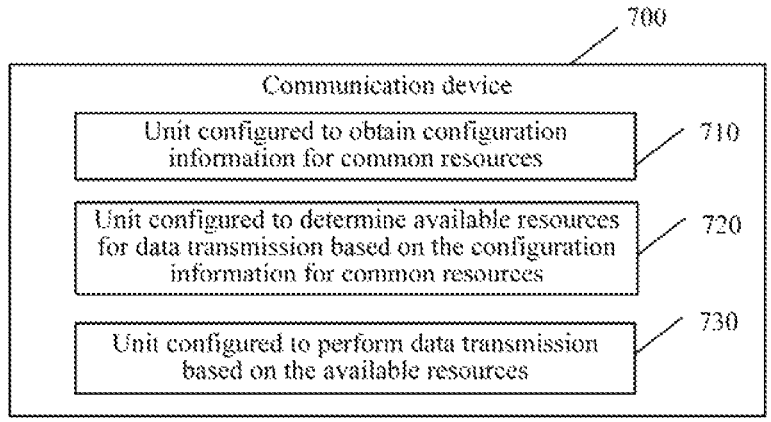
FIG. 7 is a schematic diagram of a communication device according to an embodiment of the disclosure.

FIG. 7 is a schematic diagram of a communication device 700 according to an embodiment of the disclosure.

The communication device 700 may include a unit 710 configured to obtain configuration information for common resources, a unit 720 configured to determine available resources for data transmission based on the configuration information for common resources and a unit 730 configured to perform data transmission based on the available resources. In addition, the communication device 700 may also include any other unit configured to execute the method operations, which are executed at the terminal and described above in combination with each embodiment of the disclosure.

Figure 8:
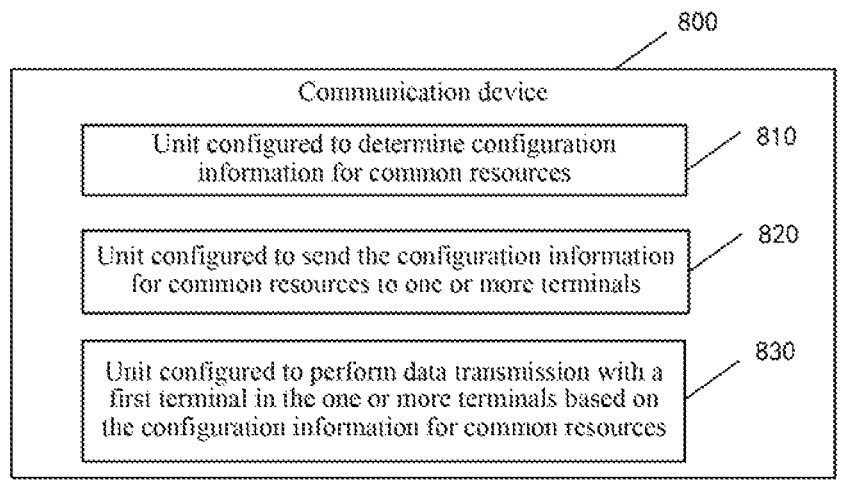
FIG. 8 is a schematic diagram of a communication device according to an embodiment of the disclosure.

FIG. 8 is a schematic diagram of a communication device 800 according to an embodiment of the disclosure.

The communication device 800 may include a unit 810 configured to determine configuration information for common resources, a unit 820 configured to send the configuration information for common resources to one or more terminals and a unit 830 configured to perform data transmission with a first terminal in the one or more terminals based on the configuration information for common resources. In addition, the communication device 800 may also include any other unit configured to execute the method operations, which are executed at the access network entity and described above in combination with each embodiment of the disclosure.

Figure 9:
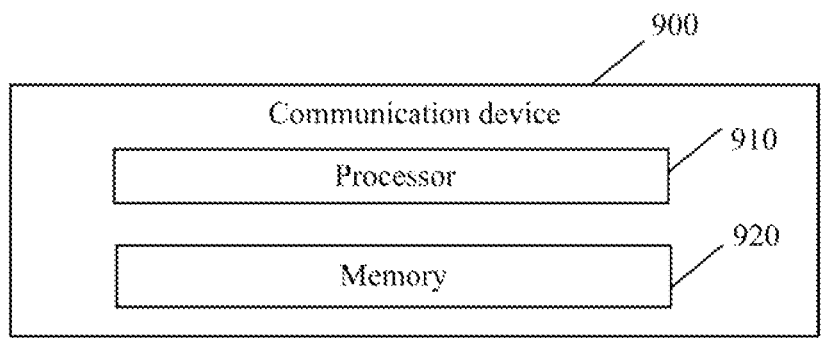
FIG. 9 is a schematic diagram of a communication device according to an embodiment of the disclosure.

FIG. 9 is a schematic diagram of a communication device 900 according to an embodiment of the disclosure.

The communication device 900 may be, for example, a terminal or an access network entity. The communication device 900 may include a processor 910 and a memory 920 connected to the processor 910. A program instruction may be stored in the memory 920, and the program instruction may be executed by the processor 910 to enable the communication device 900 to execute the method operations executed at the terminal or the access network entity and described above in combination with each embodiment of the disclosure.

Some embodiments of the disclosure are described above in combination with the drawings in detail. These embodiments may be freely combined within the scope originally recorded in the disclosure. The disclosure is not limited to these disclosed embodiments and other solutions deduced by those skilled in the art also fall within the scope of protection of the disclosure.

The processor involved in the disclosure may include intelligent hardware equipment, for example, a Central Processing Unit (CPU), a microcontroller and an Application Specific Integrated Circuit (ASIC). In addition, the processor may include various dedicated processors, for example, a coder, a queue processing module, a baseband processor, a radio head controller and a Digital Signal Processor (DSP). The memory may include various types of storage devices such as a Random Access Memory (RAM) and a Read-Only Memory (ROM).

The functions described in the disclosure may be realized by use of hardware, software/firmware or any combination thereof. If being realized by use of the software, these functions may be stored in a computer-readable medium or sent through the computer-readable medium as one or more instructions or codes. Other examples and implementation modes also fall within the scope and spirit of the contents and appended claims of the disclosure. For example, due to the essence of the software/firmware, the functions described above may be realized by use of, for example, software, hardware, firmware and hardwire executed by the processor or a combination thereof. Characteristics realizing the functions may also be at various physical positions, a distributed manner being included, thereby realizing part of the functions at different physical positions.

The above descriptions about the disclosed contents are provided to enable those skilled in the art to implement or use the disclosed contents. It is apparent for those skilled in the art that various modifications may be made to the contents of the disclosure, and general principles defined in the disclosure may be applied to other transformations without departing from the spirit or scope of the contents of the disclosure. Throughout the contents of the disclosure, term "example" or "exemplary" indicates an example or an instance but does not imply or require any preference to the mentioned example. Therefore, the contents of the disclosure are not limited to the examples and designs described in the disclosure but intended to cover the widest range consistent with the principles and novelty of the disclosure.

The invention claimed is:

1. A communication method, comprising:
   obtaining configuration information for common resources;
   determining available resources for uplink or downlink data transmission based on the configuration information for common resources; and
   performing uplink or downlink data transmission based on the available resources;
   wherein the configuration information for common resources comprises one or more items of configuration information divided within one time period, and each item of configuration information comprises at least one of a resource identifier, a time-domain resource or a frequency-domain resource; and
   wherein in a case of performing uplink data transmission on the available resources, determining the available resources for uplink data transmission comprises:
   determining, based on a terminal identifier, a transmission time period when the uplink data transmission is performed; and
   determining a corresponding item of configuration information in the configuration information for common resources based on the terminal identifier.

2. The method according to claim 1, wherein each item of configuration information further comprises at least one of a modulation and coding scheme or a transmission block size.

3. The method according to claim 1, before performing uplink data transmission on the available resources, further comprising:
   sending a preamble dedicated for common resource transmission to the access network entity;
   receiving a response message comprising uplink synchronization regulation information from the access network entity; and
   regulating uplink synchronization based on the uplink synchronization regulation information.

4. The method according to claim 3, wherein the uplink data comprises the terminal identifier.

5. The method according to claim 2, wherein in a case of performing downlink data transmission on the available resources, determining the available resources for downlink data transmission comprises:
   determining, based on a terminal identifier, a transmission time period when the downlink data transmission is performed; and
   determining a corresponding item of configuration information in the configuration information for common resources based on the terminal identifier.

6. A communication method, comprising:
   determining configuration information for common resources;
   sending the configuration information for common resources to one or more terminals; and
   performing uplink or downlink data transmission with a first terminal in the one or more terminals based on the configuration information for common resources;
   wherein the configuration information for common resources comprises one or more items of configuration information divided within a time period, and each item of configuration information comprises at least one of a resource identifier, a time-domain resource or a frequency-domain resource;
   wherein performing uplink data transmission with the first terminal based on the configuration information for common resources comprises:
   determining available resources for the uplink data transmission from the first terminal based on the configuration information for common resources; and
   receiving the uplink data from the first terminal based on the available resources;
   wherein determining the available resources for the uplink data transmission from the first terminal comprises:
   determining, based on a terminal identifier of the first terminal, a transmission time period when the uplink data transmission is performed; and
   determining a corresponding item of configuration information in the configuration information for common resources based on the terminal identifier.

7. The method according to claim 6, wherein each item of configuration information further comprises at least one of a modulation and coding scheme or a transmission block size.

8. The method according to claim 7, wherein performing downlink data transmission with the first terminal based on the configuration information for common resources comprises:
   determining available resources for downlink data transmission to the first terminal based on the configuration information for common resources; and
   sending the downlink data to the first terminal based on the available resources;
   wherein determining the available resources for downlink data transmission to the first terminal comprises:
   determining, based on a terminal identifier of the first terminal, a transmission time period when the downlink data transmission is performed; and
   determining a corresponding item of configuration information in the configuration information for common resources based on the terminal identifier.

9. The method according to claim 6, before performing uplink data transmission with the first terminal, further comprising:
   receiving a preamble dedicated for common resource transmission from the first terminal; and
   sending a response message comprising uplink synchronization regulation information to the first terminal, the uplink synchronization regulation information being configured for the first terminal to regulate uplink synchronization.

10. The method according to claim 9, wherein the uplink data comprises the terminal identifier of the first terminal.

11. A communication device, comprising: a memory and a processor, the memory storing one or more computer programs that, when executed by the processor, cause the processor to execute operations comprising:
    obtaining configuration information for common resources;
    determining available resources for uplink or downlink data transmission based on the configuration information for common resources; and
    performing uplink or downlink data transmission based on the available resources;
    wherein the configuration information for common resources comprises one or more items of configuration information divided within a time period, and each item of configuration information comprises at least one of a resource identifier, a time-domain resource or a frequency-domain resource; and
    wherein in a case that the processor executes operation of performing uplink data transmission on the available resources, the processor is configured to determine the available resources for data transmission comprises:
    determining, based on a terminal identifier, a transmission time period when the uplink data transmission is performed; and
    determining a corresponding item of configuration information in the configuration information for common resources based on the terminal identifier.

12. The device according to claim 11, wherein each item of configuration information further comprises at least one of a modulation and coding scheme or a transmission block size.

13. The device according to claim 11, before the processor executes operation of performing uplink data transmission on the available resources, the processor is further configured to:
    send a preamble dedicated for common resource transmission to the access network entity;
    receive a response message comprising uplink synchronization regulation information from the access network entity; and
    regulate uplink synchronization based on the uplink synchronization regulation information.

14. The device according to claim 13, wherein the uplink data comprises the terminal identifier.

15. The communication device according to claim 12, wherein in a case that the processor executes operation of performing downlink data transmission on the available resources, the processor is configured to determine the available resources for downlink data transmission comprises:
  determining, based on a terminal identifier, a transmission time period when the downlink data transmission is performed; and
  determining a corresponding item of configuration information in the configuration information for common resources based on the terminal identifier.

* * * * *